United States Patent
Enenkel

(10) Patent No.: US 10,736,811 B2
(45) Date of Patent: Aug. 11, 2020

(54) PORTABLE ENVIRONMENT SENSING DEVICE

(71) Applicant: ams AG, Premstätten (AT)

(72) Inventor: Jan Enenkel, Gratkorn (AT)

(73) Assignee: ams AG, Premstaetten (AT)

( * ) Notice: Subject to any disclaimer, the term of this patent is extended or adjusted under 35 U.S.C. 154(b) by 0 days.

(21) Appl. No.: 16/318,156

(22) PCT Filed: Sep. 4, 2017

(86) PCT No.: PCT/EP2017/072107
§ 371 (c)(1),
(2) Date: Jan. 16, 2019

(87) PCT Pub. No.: WO2018/046439
PCT Pub. Date: Mar. 15, 2018

(65) Prior Publication Data
US 2019/0282432 A1   Sep. 19, 2019

(30) Foreign Application Priority Data

Sep. 9, 2016 (EP) ..................................... 16188125

(51) Int. Cl.
*G01S 17/08* (2006.01)
*A61H 3/06* (2006.01)
*G01S 7/481* (2006.01)
*G01S 7/51* (2006.01)
(Continued)

(52) U.S. Cl.
CPC ............ *A61H 3/061* (2013.01); *G01S 7/4813* (2013.01); *G01S 7/51* (2013.01); *G01S 17/10* (2013.01);
(Continued)

(58) Field of Classification Search
CPC ................................ G06F 3/167; A61H 3/061
See application file for complete search history.

(56) References Cited

U.S. PATENT DOCUMENTS 5,508,699 A * 4/1996 Silverman .............. A61H 3/061
340/944
5,982,286 A * 11/1999 Vanmoor ................ G01S 15/04
340/573.4
(Continued)

FOREIGN PATENT DOCUMENTS

DE   3544047   6/1987
DE   4409447   9/1995
(Continued)

OTHER PUBLICATIONS

European Patent Office, International Search Report for PCT/EP2017/072107 dated Nov. 28, 2017.

*Primary Examiner* — Munear T Akki
(74) *Attorney, Agent, or Firm* — Fish & Richardson P.C.

(57) ABSTRACT

A portable environment sensing device is described which comprises at least one time-of-flight sensor capable of detecting the distances from the time-of-flight sensor to at least two features within the field of view of the time-of-flight sensor simultaneously. The portable environment sensing device further comprises a processing unit capable of converting the at least two measured distances into at least two different distance signals, where each distance signal is correlated with the corresponding measured distance, and an output interface providing the at least two distance signals to a user simultaneously.

16 Claims, 5 Drawing Sheets

(51) Int. Cl.
 *G01S 17/10* (2020.01)
 *G01S 17/87* (2020.01)
 *G01S 17/93* (2020.01)
(52) U.S. Cl.
 CPC ............. *G01S 17/87* (2013.01); *G01S 17/93* (2013.01); *A61H 2201/0157* (2013.01); *A61H 2201/1604* (2013.01); *A61H 2201/5007* (2013.01); *A61H 2201/5048* (2013.01); *A61H 2201/5092* (2013.01); *A61H 2205/02* (2013.01); *A61H 2205/022* (2013.01); *A61H 2205/024* (2013.01); *A61H 2205/027* (2013.01)

(56) References Cited

U.S. PATENT DOCUMENTS

| | | |
|---|---|---|
| 7,755,744 B1 | 7/2010 | Leberer |
| 10,251,788 B1 * | 4/2019 | Phan .................. A61F 9/08 |
| 2002/0067271 A1 | 6/2002 | Depta |
| 2008/0088469 A1 | 4/2008 | Doemens et al. |
| 2012/0092460 A1 * | 4/2012 | Mahoney ........... G06K 9/00664 348/46 |
| 2013/0044005 A1 * | 2/2013 | Foshee ................ G09B 21/007 340/691.1 |
| 2013/0093852 A1 | 4/2013 | Ye |
| 2013/0220392 A1 | 8/2013 | Gassert et al. |
| 2014/0085446 A1 | 3/2014 | Hicks |
| 2016/0033644 A1 * | 2/2016 | Moore ................... G01S 17/10 356/5.01 |
| 2017/0249862 A1 * | 8/2017 | Border ................. H04N 7/183 |
| 2018/0243157 A1 * | 8/2018 | Takada ..................... A61H 3/06 |

FOREIGN PATENT DOCUMENTS

| | | |
|---|---|---|
| DE | 102007046283 | 4/2009 |
| WO | 2012/040703 | 3/2012 |

* cited by examiner

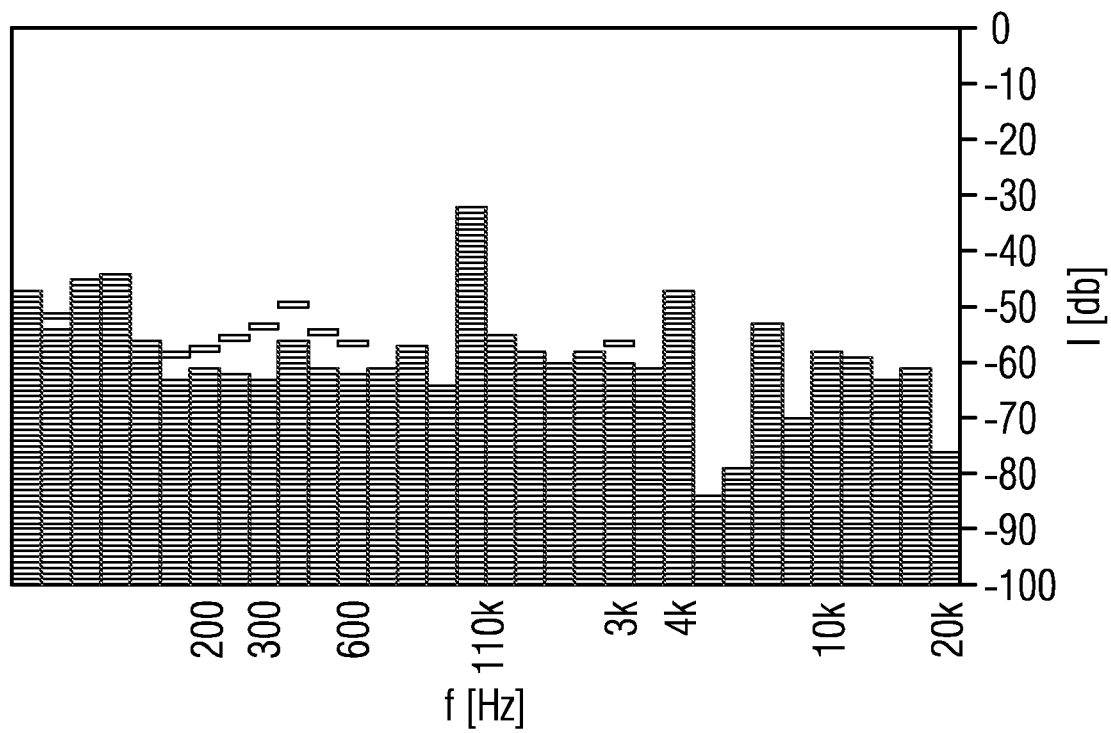

PORTABLE ENVIRONMENT SENSING DEVICE

The present invention relates to a portable environment sensing device.

BACKGROUND OF THE INVENTION

The present disclosure relates to the field of environment sensors for blind or visually impaired persons. Environment sensors can convey information about objects in the vicinity of a user. One example is the white cane. With a white cane a user can gain information about obstacles on the floor and also, for example, steps. However, by moving the white cane around on the floor no information can be obtained about obstacles or objects at another height above the floor. Furthermore, the range in which objects on the floor can be detected is limited by the length of the white cane.

SUMMARY OF THE INVENTION

The present disclosure provides a portable environment sensing device capable of providing the distance between the environment sensing device and at least two features in the field of view of the environment sensing device to a user simultaneously.

In one embodiment the portable environment sensing device comprises at least one time-of-flight sensor capable of detecting the distances from the time-of-flight sensor to at least two features within the field of view of the time-of-flight sensor simultaneously. A time-of-flight sensor can, for example, be designed to send out pulses of electromagnetic radiation in form of a beam. The electromagnetic beam is reflected at the features and objects within the field of view of the time-of-flight sensor. The reflected electromagnetic radiation is detected by the time-of-flight sensor. The distance between the time-of-flight sensor and a feature at which electromagnetic radiation is reflected can be determined from the time that a pulse of electromagnetic radiation needs to travel from the time-of-flight sensor to the feature and back to the time-of-flight sensor.

Features within the field of view of the time-of-flight sensor can be any features or objects in the vicinity of the time-of-flight sensor as, for example, vehicles, humans, animals or objects such as walls and doors. Features can also be parts of objects that are closer to the time-of-flight sensor than other parts of the object. The field of view of the time-of-flight sensor is the range in which the time-of-flight sensor can measure distances between features and the time-of-flight sensor. This means, that the field of view is an angular range which is captured by the electromagnetic beam. For example the field of view can comprise the shape of a cone. The opening angle of the field of view of the time-of-flight sensor can, for example, be between 0° and 45°. Preferably, the opening angle of the field of view of the time-of-flight sensor is between 21 and 23°.

In one embodiment the portable environment sensing device comprises a processing unit capable of converting the at least two measured distances into at least two different distance signals where each distance signal is correlated with the corresponding measured distance. This means, that there may be a relation how a measured distance is correlated with the corresponding distance signal.

In one embodiment the portable environment sensing device comprises an output interface which provides the at least two distance signals to a user simultaneously. At the output interface, for example, another device can be connected in order to provide the distance signals to a user. As an example the distance signals can comprise audible frequencies or mechanical vibrations. With this, the information of the distance signals can be provided to blind or visually impaired users.

With the portable environment sensing device providing two or more distance signals to a user simultaneously, the user can obtain information about his environment. By moving the portable environment sensing device the user can, for example, change the field of view of the time-of-flight sensor and thus obtain information about different objects in his environment. Therefore, in comparison to a white cane it is not only possible to obtain information about obstacles on the floor but also at different heights. It is also possible to obtain information about several objects at the same time because the opening angle of the field of view of the time-of-flight sensor is optionally between 21 and 23°. By moving the position of the portable environment sensing device or by changing the field of view of the time-of-flight sensor objects can be examined from different directions or angles. Therefore, the portable environment sensing device enables a safer movement of blind or visually impaired persons.

In one embodiment the portable environment sensing device comprises at least one time-of-flight sensor, a processing unit and an output interface which provides the at least two distance signals to a user simultaneously.

In one embodiment of the portable environment sensing device the time-of-flight sensor comprises an emitter capable of emitting electromagnetic radiation and a sensor capable of detecting electromagnetic radiation emitted by the emitter and reflected at features within the field of view of the time-of-flight sensor. The time-of-flight sensor further comprises a data processing unit capable of providing the distances between the time-of-flight sensor and the features at which the electromagnetic radiation is reflected by measuring the difference in time between the emission of electromagnetic radiation from the emitter and the detection of the reflected electromagnetic radiation by the sensor.

The emitter can be, for example, a laser. For example, the emitter can be a vertical cavity surface emitting laser. Advantageously, the electromagnetic radiation is in the infrared range so that users cannot see the electromagnetic radiation. The electromagnetic radiation may be modulated, for example pulsed. The sensor can detect reflected electromagnetic radiation and ambient radiation. The sensor can be, for example, a single photon avalanche diode. The time-of-flight sensor can comprise one or more emitters and one or more sensors. The time-of-flight sensor can measure distances at different light conditions and also for objects with different reflection coefficients.

In one embodiment of the portable environment sensing device the at least two different distance signals comprise audible frequencies. For example, the audible frequencies can be related to the measured distances between the time-of-flight sensor and a feature such that a frequency band or a single frequency can represent a certain distance. As an example the audible frequencies and the measured distances can be related in such a way that the shorter the measured distance, the higher the audible frequency. The relation between a measured distance and a corresponding audible frequency can also be given by a specific algorithm of the processing unit or a lookup table. A filter for the audible frequencies can be employed to make the audible frequencies more comfortable to hear for the user. Also algorithms can be employed in the processing unit for focussing on peaks in the audible frequencies or to adapt for example the volume of the audible frequencies to the light conditions. With this, the user is provided with a histogram of different audible frequencies where the audible frequencies are correlated with the distances from the time-of-flight sensor to features in the vicinity of the time-of-flight sensor. Since the opening angle of the field of view of the time-of-flight sensor is optionally between 21 and 23°, the user can obtain information about several features in his environment simultaneously.

In one embodiment of the portable environment sensing device the output interface is connected to at least one speaker. This means, that the output interface can, for example, be connected to headphones. With this, distance signals comprising audible frequencies can be played to the user.

In one embodiment the portable environment sensing device is connected to at least one microphone which records environmental sound from the environment of the user and the output interface provides the recorded environmental sound to the user. If the user, for example, wears headphones on both ears, sound and noise from the environment can be recorded by the microphone and provided to the user via the output interface.

In one embodiment of the portable environment sensing device the intensity of an audible frequency of a distance signal relates to the proportional size of the corresponding feature in the field of view of the time-of-flight sensor. At larger objects a higher fraction of the electromagnetic radiation emitted by the time-of-flight sensor is reflected back to the time-of-flight sensor than at smaller objects. Therefore, the intensity of an audible frequency corresponding to a larger object is increased in comparison to smaller objects. Therefore, the user can also obtain information about the size of features and objects in his vicinity.

In one embodiment the portable environment sensing device is comprised by wearable glasses or a watch. This means, the portable environment sensing device can, for example, be mounted on glasses. In this case the field of view of the time-of-flight sensor can be changed if the user turns his head. In another example the portable environment sensing device can be mounted on a watch so that the field of view of the time-of-flight sensor can be changed by moving the arm with the watch.

In one embodiment the portable environment sensing device is comprised by wearable glasses and the portable environment sensing device further comprises at least one camera capable of detecting in which direction the eyeball of the user looks. Furthermore, the field of view of the time-of-flight sensor is oriented towards the direction in which the eyeball of the user looks. This means, that in the case that the user can move the eyeball or any part of the eye in different directions, the camera can detect this movement. An algorithm can calculate the angle of the direction the eyeball faces and with this the field of view of the time-of-flight sensor can be oriented in the same direction. For this, the time-of-flight sensor can, for example, comprise a rotational motor in order to change the field of view.

In one embodiment of the portable environment sensing device the at least two different distance signals comprise mechanical vibrations and the output interface is connected to a mechanical motor. With this, the information about different distances to features in the field of view of the time-of-flight sensor are converted into different mechanical vibrations. Therefore, the user can sense with, for example, the hands the different distance signals. The different distance signals can be converted into different mechanical vibrations so that the user can obtain information about features in his vicinity. The mechanical motor can, for example, be part of a watch.

In one embodiment the portable environment sensing device comprises at least one further time-of-flight sensor and at least one further output interface and for each time-of-flight sensor the corresponding distance signals are provided simultaneously to the user by the corresponding output interface. This means, for example, that two time-of-flight sensors with different fields of view can provide distance signals to one speaker each so that the user is provided with distance signals from different directions for each speaker. The speaker can be arranged in headphones. Since the human brain is capable of processing audio signals in stereo, the user can obtain information about his environment from the different fields of view of the two time-of-flight sensors.

If the field of view of the two or more time-of-flight sensors overlap the user can obtain more information about features and more precisely visualize the shape of objects. With this, the user can obtain more precise information and he can move more safely.

In one embodiment of the portable environment sensing device the processing unit synchronizes the at least two time-of-flight sensors. The at least two time-of-flight sensors can be synchronized in such a way that for example the further sensor does not detect electromagnetic radiation in the same moment in that the emitter of the time-of-flight sensor emits a pulsed signal.

In one embodiment of the portable environment sensing device the field of view of the at least one time-of-flight sensor changes repeatedly in a predefined way. In this case the user does not have to change the position of the portable environment sensing device to change the field of view of the at least one time-of-flight sensor.

In one embodiment of the portable environment sensing device at least one color sensor which is sensitive to the wavelength of the reflected electromagnetic radiation is comprised by the portable environment sensing device such that it has a field of view equal to or similar to that of at least one time-of-flight sensor. Furthermore, the processing unit converts the wavelength-dependent information obtained by the at least one color sensor into color signals and the output interface provides the color signals to the user. With this, the user can also be provided with information about the color of features in his vicinity such as, for example, colored marks on a street. The color signals can be provided to the user in a different shape than the distance signals. For example, the color signals can comprise an additional harmonic frequency in comparison to the regular frequency. In this case the color signals are only provided if they are required and the provision of the color signals can be switched on and off.

In one embodiment of the portable environment sensing device at least one temperature sensor, which is sensitive to infrared light, is comprised by the portable environment sensing device and obtains information about the temperature of objects in its field of view. Furthermore, the processing unit converts the information about the temperature of objects obtained by the temperature sensor into temperature signals for the output interface. By providing a temperature signal the user can be warned in case of hot objects in his environment. Moreover, the temperature sensor can provide information about the light conditions in the environment in order, for example, to adjust the volume of the audible frequencies. For example, in bright sunlight conditions the volume of the audible frequencies can be adjusted not to be too loud.

The color signals and the temperature signals can also be provided as pulsed signals to the user which means that, for example, the corresponding audible frequencies are not provided in a continuous way but in a pulsed way. Furthermore, the color signals and the temperature signals can be switched on and off.

In one embodiment the portable environment sensing device is implemented as an integrated system on a chip. This means that, for example, the sensors and the processing unit can be arranged as an integrated system on a chip.

BRIEF DESCRIPTION OF THE DRAWINGS

The following description of figures may further illustrate and explain exemplary embodiments. Components that are functionally identical or have an identical effect are denoted by identical references. Identical or effectively identical components might be described only with respect to the figures where they occur first. Their description is not necessarily repeated in successive figures.

FIGS. 3 and 4 show exemplary histograms of audible frequencies representing measured distances.

DETAILED DESCRIPTION

Figure 1:
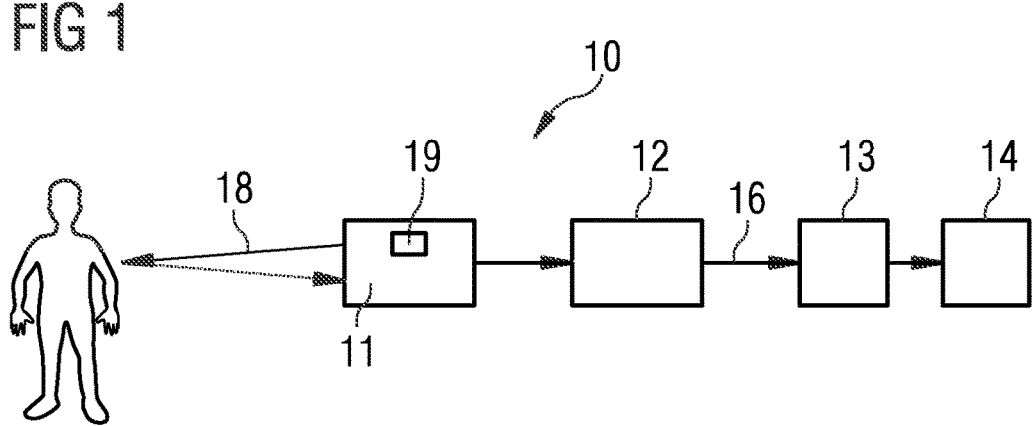
FIG. 1 shows the setup of an exemplary embodiment of the portable environment sensing device.

FIG. 1 shows the setup of an exemplary embodiment of the portable environment sensing device 10. A time-of-flight sensor 11 can emit electromagnetic radiation, for example an electromagnetic beam 18, which is reflected at features within the field of view 21 of the time-of-flight sensor 11. In this case the feature is the arm of a person. The reflected electromagnetic radiation is detected by the time-of-flight sensor 11. The time-of-flight sensor 11 comprises a data processing unit 19 which provides the measured distances between the time-of-flight sensor 11 and features in the field of view 21 of the time-of-flight sensor 11. The time-of-flight sensor 11 provides the measured distances to a processing unit 12. The processing unit 12 converts the at least two measured distances into at least two different distance signals 16. An output interface 13 provides the at least two different distance signals 16. In this case a speaker 14 is connected to the output interface 13 so that the distance signals 16 can be provided to a user 20 by the speaker 14.

Figure 2:
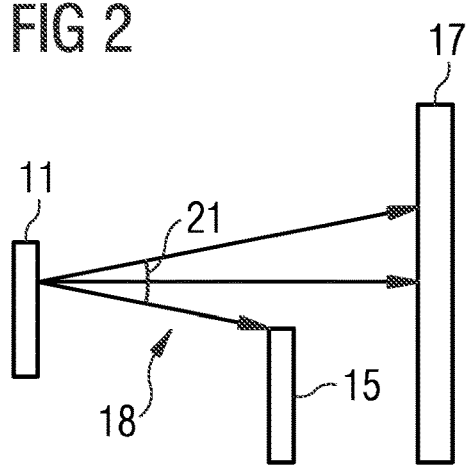
In FIG. 2 the field of view of a time-of-flight sensor is illustrated.

FIG. 2 shows a time-of-flight sensor 11 with its field of view 21. The electromagnetic beam 18 emitted by the time-of-flight sensor 11 is reflected at several features within the field of view 21 of the time-of-flight sensor 11. In this case a portion of the electromagnetic beam 18 is reflected at a first feature 15 and a larger portion is reflected at a second feature 17.

Figure 3:
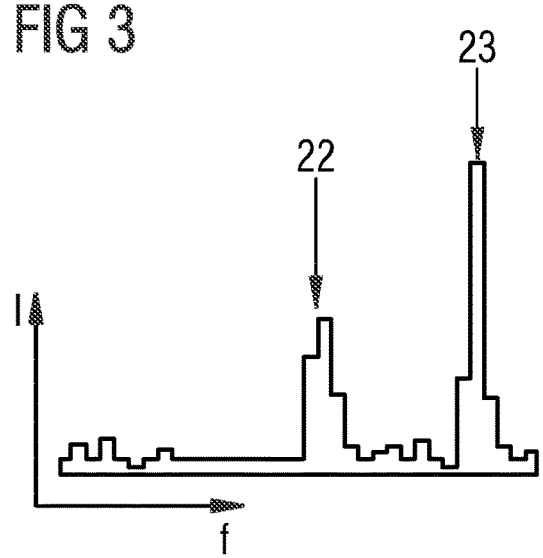

FIG. 3 shows an exemplary histogram of audible frequencies representing measured distances. The intensity I is plotted over the audible frequencies f. The distance signal 16 can be converted into audible frequencies f which can be provided to a user 20 simultaneously. Therefore, the user 20 is provided with a histogram of audible frequencies f. In this case the intensity I of a frequency f in the histogram is correlated with the proportional size of the corresponding feature in the field of view 21 of the time-of-flight sensor 11. For example, the first peak 22 in the histogram can correspond to the distance measured to the first feature 15 shown in FIG. 2. The second peak 23 in the histogram can correspond to the distance measured to the second feature 17 shown in FIG. 2. Since the second feature 17 is larger than the first feature 15 within the field of view 21 of the time-of-flight sensor 11 a larger fraction of the electromagnetic radiation is reflected at the second feature 17. Therefore, the frequency f representing the distance to the second feature 17 is provided with a higher intensity I than the first peak 22 representing the distance to the first feature 15. The measured distances between the time-of-flight sensor 11 and features within the field of view 21 of the time-of-flight sensor 11 can be correlated in such a way that the closer the feature is to the time-of-flight sensor 11, the higher the frequency f will be in the histogram.

FIG. 4 shows another exemplary histogram of audible frequencies f representing distance signals 16. Certain frequency bands can represent measured distances within the field of view 21 of the time-of-flight sensor 11.

Figure 5A:
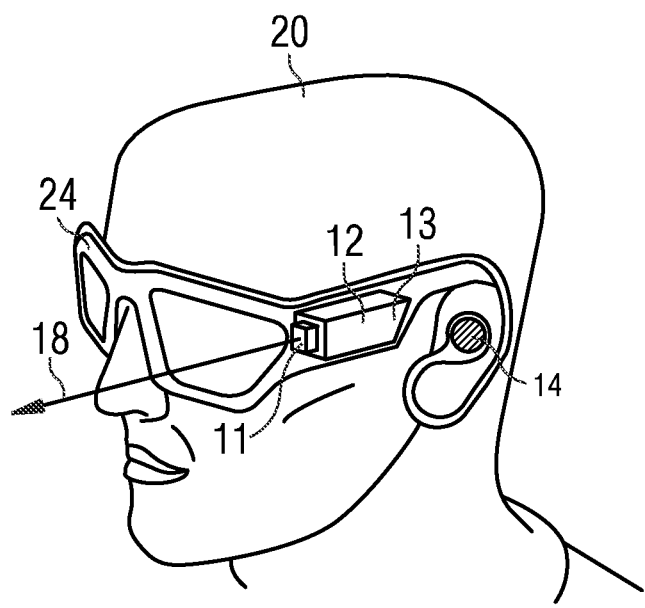
FIGS. 5A and 5B show exemplary embodiments of the portable environment sensing device which is comprised by glasses.

FIG. 5A shows an exemplary embodiment of the portable environment sensing device 10 which is comprised by glasses 24. The time-of-flight sensor 11 and the processing unit 12 are mounted on the glasses 24. The time-of-flight sensor 11 emits an electromagnetic beam 18 in the direction that the user 20 is facing. The output interface 13 is connected to a speaker 14 which in this case is a headphone. By moving the head, the user 20 can change the field of view 21 of the time-of-flight sensor 11 and can thus gain information about his environment.

Figure 5B:
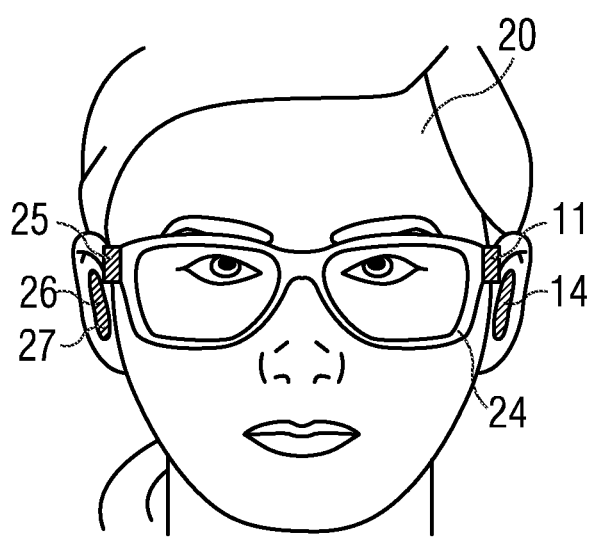

FIG. 5B shows another exemplary embodiment of a portable environment sensing device 10 which is comprised by glasses 24. A time-of-flight sensor 11 and a further time-of-flight sensor 25 are mounted on the glasses 24. Furthermore, a speaker 14 and a further speaker 26 are connected to the portable environment sensing device 10. By employing two time-of-flight sensors 11, 25, the total field of view of the user 20 can be increased. It is also possible to arrange a microphone 27 on the glasses 24 or on the side of the speakers 14, 26 facing away from the ear of the user 20. The microphone 27 can record environmental sound or noise which can be provided to the user 20 by the speakers 14, 26. With this, the user 20 can also hear environmental sounds and not only the audible frequencies f representing the distance signals 16.

Figure 6:
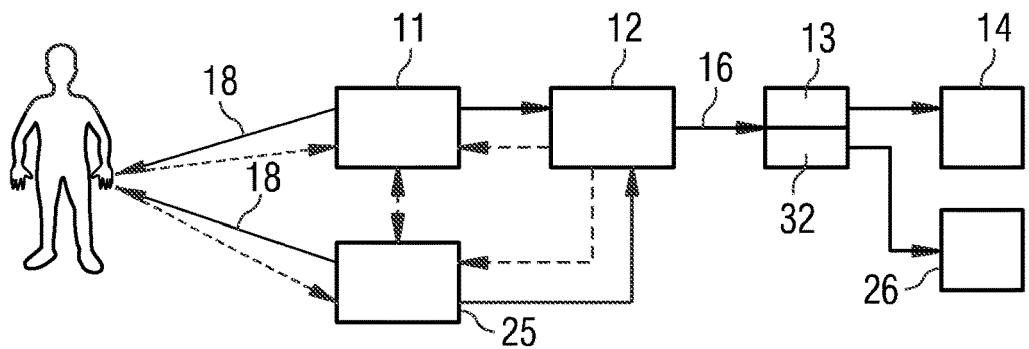
FIG. 6 shows the setup of an exemplary embodiment of the portable environment sensing device with two time-of-flight sensors.

FIG. 6 shows the setup of an exemplary embodiment of the portable environment sensing device 10 with two time-of-flight sensors 11, 25. Both time-of-flight sensors 11, 25 emit an electromagnetic beam 18 which is reflected at features within their field of view 21. As indicated by the dashed arrows, the time-of-flight sensors 11, 25 are synchronized with each other in such a way that they only detect reflected electromagnetic radiation from their own emitted electromagnetic beam 18. Both time-of-flight sensors 11, 25 provide the processing unit 12 with their measured distances. The processing unit 12 converts the measured distances into distance signals 16 and provides a set of distance signals 16 to the output interface 13 and the further output interface 32 each. Two speakers 14, 26 are connected to the output interface 13 and the further output interface 32, where each speaker 14, 26 is provided with the distance signals 16 corresponding to one of the time-of-flight sensors 11, 25 so that the user is provided with distance signals from different directions for each speaker 14, 26. By employing two time-of-flight sensors 11, 25, the user 20 can detect the same feature or object from different directions and thus obtain more information about the shape of a certain feature or object.

Figure 7:
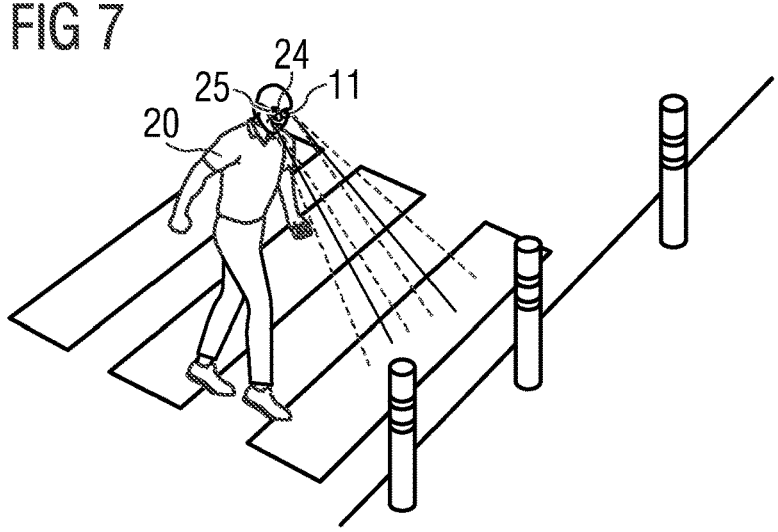
In FIG. 7 the field of view of two time-of-flight sensors is illustrated.

FIG. 7 illustrates the increased field of view of two time-of-flight sensors 11, 25 mounted on glasses 24.

Figure 8:
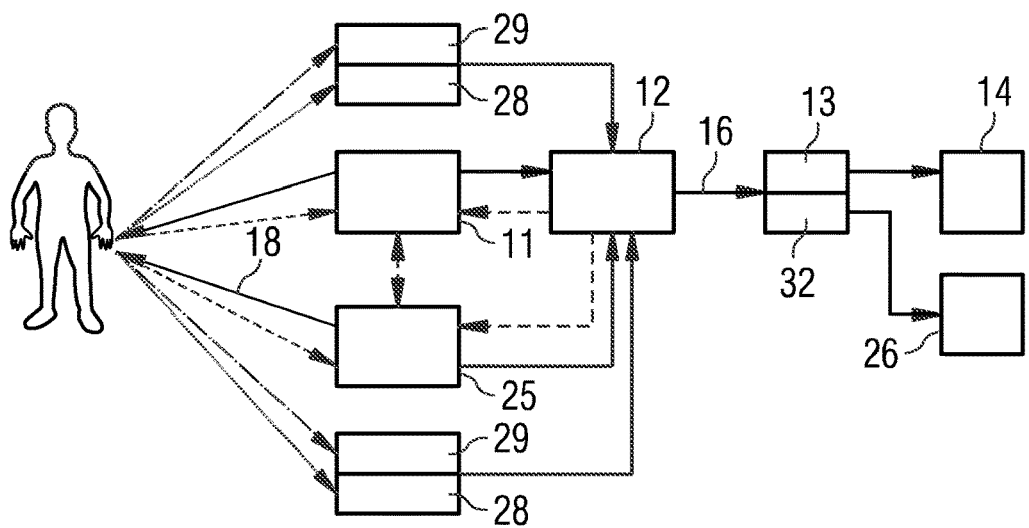
FIG. 8 shows the setup of an exemplary embodiment of the portable environment sensing device with two time-of-flight sensors, color sensors and temperature sensors.

FIG. 8 shows the setup of an exemplary embodiment of the portable environment sensing device 10 with two time-of-flight sensors 11, 25 and color sensors 28. The portable environment sensing device 10 further comprises temperature sensors 29 which are sensitive to infrared radiation. The color sensors 28 are sensitive to the wavelength of reflected light such that the user 20 can be provided with information about the color of features within the field of view 21 of the time-of-flight sensor 11. With this, the user 20 can also be provided with information about the color of features in his vicinity such as, for example, colored marks on a street. The processing unit 12 converts the wavelength-dependent information obtained by the color sensors 28 into color signals which are also provided to the user 20. The temperature sensors 29 are sensitive to infrared light and can therefore provide information to the user 20 about the temperature of objects in the field of view 21 of the time-of-flight sensors 11, 25. Therefore, the user 20 can be warned if he approaches hot objects.

Figure 9:
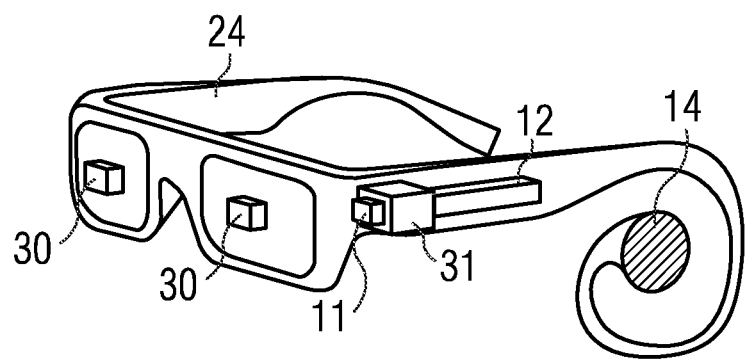
FIG. 9 shows an exemplary embodiment of the portable environment sensing device which is comprised by glasses which comprise two cameras.

FIG. 9 shows an exemplary embodiment of the portable environment sensing device 10 which is comprised by glasses 24 which also comprise two cameras 30. The cameras 30 detect in which direction the eyeball of the user 20 looks and with this the field of view 21 of the time-of-flight sensors 11, 25 can be oriented towards the direction in which the eyeball of the user 20 looks.

Figure 10:
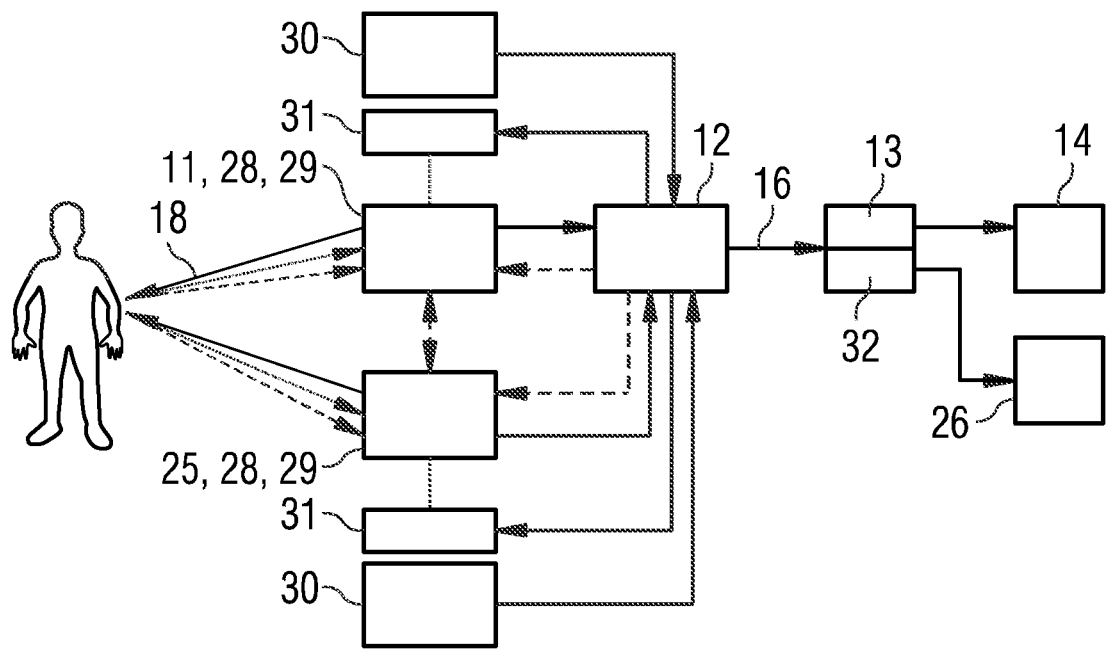
FIG. 10 shows the setup of an exemplary embodiment of the portable environment sensing device with two time-of-flight sensors, color sensors, temperature sensors, two rotational motors and two cameras.

FIG. 10 shows the setup of another exemplary embodiment of the portable environment sensing device 10. If the portable environment sensing device 10 is comprised by glasses 24, cameras 30 can be mounted on the glasses 24 in order to detect the movement of the eyeballs of the user 20. The direction of the eyeballs detected by the cameras 30 is provided to the processing unit 12. The processing unit 12 provides this information to rotational motors 31 on which the time-of-flight sensors 11, 25 are mounted. With this, the field of view 21 of the time-of-flight sensors 11, 25 can be changed according to the movement of the eyeballs of the user 20. The time-of-flight sensors 11, 25 further comprise color sensors 28 and temperature sensors 29. The output interface 13 is connected to speakers 14, 26. Instead of employing a camera 30 it is also possible to change the field of view 21 of the time-of-flight sensors 11, 25 by repeatedly changing the field of view 21 with the rotational motors 31.

The invention claimed is:

1. A portable environment sensing device, comprising:
at least one time-of-flight sensor operable to detect at least two distances from the at least one time-of-flight sensor to at least two objects, respectively, within a field of view of the at least one time-of-flight sensors, wherein the at least one time-of-flight sensor comprises:
an emitter operable to emit electromagnetic radiation towards the at least two objects concurrently,
a sensor operable to detect electromagnetic radiation emitted by the emitter and reflected from the at least two objects concurrently, and
a data processing unit operable to detect the at least two distances from the at least one time-of-flight sensor based on output from the emitter and output from the sensor;
a processing unit operable to convert the detected distances into at least two different distance signals, where each distance signal of the at least two different distance signals is correlated with a corresponding one of the detected distances, and
an output interface operable to provide the at least two different distance signals to a user simultaneously.

2. The portable environment sensing device according to claim 1,
wherein the data processing unit is operable to provide the at least two distances from the at least one time-of-flight sensor and the objects from which the electromagnetic radiation is reflected by measuring a difference in time between the emission of electromagnetic radiation from the emitter and the detection of the reflected electromagnetic radiation by the sensor.

3. The portable environment sensing device according to claim 1, wherein the at least two different distance signals comprise audible frequencies.

4. The portable environment sensing device according to claim 1, wherein the output interface is connected to at least one speaker.

5. The portable environment sensing device according to claim 4, wherein
the portable environment sensing device is connected to at least one microphone operable to record environmental sound, and
the output interface is operable to provide the recorded environmental sound to the user.

6. The portable environment sensing device according to claim 3, wherein an intensity of an audible frequency of each distance signal of the at least two different distance signals relates to a proportional size of a corresponding object of the objects in the field of view of the at least one time-of-flight sensor.

7. The portable environment sensing device according to claim 1, wherein the portable environment sensing device is comprised by wearable glasses or a watch.

8. The portable environment sensing device according to claim 1, wherein
the portable environment sensing device is comprised by wearable glasses,
the portable environment sensing device further comprises at least one camera operable to detect a direction in which an eyeball of the user looks, and
the at least one time-of-flight sensor is operable to orient the field of view towards the direction in which the eyeball of the user looks.

9. The portable environment sensing device according to claim 1, wherein the at least two different distance signals comprise mechanical vibrations and the output interface is connected to a mechanical motor.

10. The portable environment sensing device according to claim 1, wherein
the portable environment sensing device comprises at least one further time-of-flight sensor and at least one further output interface, and
the at least two time-of-flight sensors are operable to provide corresponding distance signals simultaneously to the user by a corresponding output interface.

11. The portable environment sensing device according to claim 10, wherein the processing unit is operable to synchronize the at least two time-of-flight sensors.

12. The portable environment sensing device according to claim 1, wherein the field of view of the at least one time-of-flight sensor changes repeatedly in a predefined way during operation of the portable environment sensing device.

13. The portable environment sensing device according to claim 1, wherein
the portable environment sensing device comprises at least one color sensor sensitive to a wavelength of reflected light, the at least one color sensor having a second field of view equal to or similar to the field of view of the at least one time-of-flight sensor,
the processing unit is operable to convert wavelength-dependent information obtained by the at least one color sensor into color signals, and
the output interface is configured to provide the color signals to the user.

14. The portable environment sensing device according to claim 1, wherein
the portable environment sensing device comprises at least one temperature sensor sensitive to infrared light and operable to obtain information about a temperature of objects in a field of view of the at least one temperature sensor, and
the processing unit is operable to convert the information about the temperature of objects obtained by the at least one temperature sensor into temperature signals for the output interface.

15. The portable environment sensing device according to claim 1, wherein the portable environment sensing device is implemented as an integrated system on a chip.

16. The portable environment sensing device according to claim 1,
wherein a first distance signal of the at least two different distance signals comprises a first audible frequency or frequency band,
wherein a second distance signal of the at least two different distance signals comprises a second audible frequency or frequency band, the first audible frequency or frequency band being different from the second audible frequency or frequency band, and
wherein the processing unit is operable to convert the detected distances into at least:
a first distance signal from among the two different distance signals based on the first audible frequency or frequency band, and
a second distance signal from among the two different distance signals based on the second audible frequency or frequency band.

* * * * *

UNITED STATES PATENT AND TRADEMARK OFFICE
CERTIFICATE OF CORRECTION

PATENT NO. : 10,736,811 B2  
APPLICATION NO. : 16/318156  
DATED : August 11, 2020  
INVENTOR(S) : Jan Enenkel Page 1 of 1

It is certified that error appears in the above-identified patent and that said Letters Patent is hereby corrected as shown below:

In the Claims

<u>Column 8</u>  
Claim 1, Line 6, delete "sensors," and insert -- sensor, --.

Signed and Sealed this  
Sixth Day of October, 2020

Andrei Iancu  
*Director of the United States Patent and Trademark Office*